US010979670B2

(12) United States Patent
Hodge

(10) Patent No.: US 10,979,670 B2
(45) Date of Patent: *Apr. 13, 2021

(54) SECURE NONSCHEDULED VIDEO VISITATION SYSTEM

(71) Applicant: **GLOBAL TEL*LINK CORPORATION**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,861

(22) Filed: Mar. 4, 2019

(65) Prior Publication Data

US 2020/0036943 A1    Jan. 30, 2020

Related U.S. Application Data

(63) Continuation of application No. 15/713,181, filed on Sep. 22, 2017, now Pat. No. 10,225,518, which is a
(Continued)

(51) Int. Cl.
*H04N 7/14* (2006.01)
*H04N 7/15* (2006.01)
(Continued)

(52) U.S. Cl.
CPC ......... *H04N 7/155* (2013.01); *G06K 9/00288* (2013.01); *G06K 9/00771* (2013.01);
(Continued)

(58) Field of Classification Search
CPC ...................................................... H04N 7/14
See application file for complete search history.

(56) References Cited

U.S. PATENT DOCUMENTS

| 4,360,827 A | 10/1982 | Braun |
| 4,965,819 A | 10/1990 | Kannes |

(Continued)

FOREIGN PATENT DOCUMENTS

CA    2845843 A1    9/2014

OTHER PUBLICATIONS

Bowyer et al., "A survey of approaches and challenges in 3D and multi-modal 3D+2D face recognition," Computer Vision and Image Understanding, vol. 101, No. 1, 2006; pp. 1-15.
(Continued)

*Primary Examiner* — Olisa Anwah
(74) *Attorney, Agent, or Firm* — Sterne, Kessler, Goldstein & Fox P.L.L.C.

(57) ABSTRACT

Described are methods and systems in which the censorship and supervision tasks normally performed by secured facility personnel are augmented or automated entirely by a Secure Nonscheduled Video Visitation System. In embodiments, the Secure Nonscheduled Video Visitation System performs voice biometrics, speech recognition, non-verbal audio classification, fingerprint and other biometric authentication, image object classification, facial recognition, body joint location determination analysis, and/or optical character recognition on the video visitation data. The Secure Nonscheduled Video Visitation utilizes these various analysis techniques in concert to determine if all rules and regulations enforced by the jurisdiction operation the secured facility are being followed by the parties to the video visitation session.

19 Claims, 9 Drawing Sheets

Related U.S. Application Data continuation of application No. 15/477,307, filed on Apr. 3, 2017, now Pat. No. 9,774,826, which is a continuation of application No. 15/341,517, filed on Nov. 2, 2016, now Pat. No. 9,615,060, which is a continuation of application No. 15/078,724, filed on Mar. 23, 2016, now Pat. No. 9,558,523.

(51) Int. Cl.
| | | |
|---|---|---|
| *G06Q 50/26* | (2012.01) | |
| *G06K 9/00* | (2006.01) | |
| *G10L 17/06* | (2013.01) | |
| *G10L 17/22* | (2013.01) | |
| G10L 17/00 | (2013.01) | |
| G10L 15/00 | (2013.01) | |
| G06F 21/32 | (2013.01) | |
| G06F 21/31 | (2013.01) | |

(52) U.S. Cl.
CPC ......... *G06K 9/00926* (2013.01); *G06Q 50/26* (2013.01); *G10L 17/06* (2013.01); *G10L 17/22* (2013.01); *H04N 7/15* (2013.01); *G06F 21/31* (2013.01); *G06F 21/32* (2013.01); *G06F 2221/2139* (2013.01); *G06K 9/00221* (2013.01); *G06K 9/00885* (2013.01); *G06K 2209/01* (2013.01); *G10L 15/00* (2013.01); *G10L 17/00* (2013.01)

(56) References Cited

U.S. PATENT DOCUMENTS

| | | | |
|---|---|---|---|
| 4,994,908 A | 2/1991 | Kuban et al. | |
| 5,541,639 A | 7/1996 | Takatsuki et al. | |
| 5,553,609 A | 9/1996 | Chen et al. | |
| 5,559,875 A | 9/1996 | Bieselin et al. | |
| 5,589,873 A | 12/1996 | Natori et al. | |
| 5,589,878 A | 12/1996 | Cortjens et al. | |
| 5,642,156 A | 6/1997 | Saiki | |
| 5,719,928 A | 2/1998 | Pinnell et al. | |
| 5,781,731 A | 7/1998 | Koreeda et al. | |
| 5,841,469 A | 11/1998 | Freeman et al. | |
| 5,848,132 A | 12/1998 | Morley et al. | |
| 5,852,466 A | 12/1998 | Komine et al. | |
| 5,961,446 A | 10/1999 | Beller et al. | |
| 5,978,363 A | 11/1999 | Dimitrijevic et al. | |
| 5,999,208 A | 12/1999 | McNerney et al. | |
| 6,009,169 A | 12/1999 | Styron | |
| 6,163,798 A | 12/2000 | Frank | |
| 6,181,789 B1 | 1/2001 | Siegmund et al. | |
| 6,192,118 B1 | 2/2001 | Bayless et al. | |
| 6,195,117 B1 | 2/2001 | Miyazaki | |
| 6,205,716 B1 | 3/2001 | Peltz | |
| 6,219,640 B1 | 4/2001 | Basu et al. | |
| 6,275,251 B1 | 8/2001 | Hartman et al. | |
| 6,734,900 B2 | 5/2004 | Mayhew | |
| 6,879,828 B2 | 4/2005 | Virtanen et al. | |
| 7,027,659 B1 | 4/2006 | Thomas | |
| 7,046,779 B2 | 5/2006 | Hesse | |
| 7,061,521 B2 | 6/2006 | Bulriss et al. | |
| 7,106,843 B1 | 9/2006 | Gainsboro et al. | |
| 7,256,816 B2 | 8/2007 | Profanchik et al. | |
| 7,436,988 B2 | 10/2008 | Zhang et al. | |
| 7,519,169 B1 | 4/2009 | Hingoranee et al. | |
| 7,899,167 B1 | 3/2011 | Rae | |
| 7,911,513 B2 | 3/2011 | Garrison et al. | |
| 8,218,829 B2 | 7/2012 | Kenoyer | |
| 8,370,206 B2 | 2/2013 | Collins | |
| 8,489,887 B1 | 7/2013 | Newman et al. | |
| 8,917,848 B2 | 12/2014 | Torgersrud et al. | |
| 8,929,525 B1 | 1/2015 | Edwards | |
| 9,007,420 B1 | 4/2015 | Passe | |
| 9,007,425 B1 * | 4/2015 | Simon .................. | H04N 7/147 348/14.05 |
| 9,058,474 B2 | 6/2015 | Alvord et al. | |
| 9,064,257 B2 | 6/2015 | Beigi | |
| 9,065,971 B2 | 6/2015 | Verthein et al. | |
| 9,083,850 B1 | 7/2015 | Higgs | |
| 9,094,569 B1 | 7/2015 | Humphries | |
| 9,106,789 B1 * | 8/2015 | Shipman, Jr. .......... | H04N 7/147 |
| 9,232,051 B2 | 1/2016 | Torgersrud et al. | |
| 9,300,790 B2 | 3/2016 | Gainsboro et al. | |
| 9,420,094 B1 | 8/2016 | Keiser et al. | |
| 9,558,523 B1 | 1/2017 | Hodge | |
| 9,615,060 B1 | 4/2017 | Hodge | |
| 9,661,272 B1 | 5/2017 | Daniel | |
| 9,681,097 B1 | 6/2017 | Hodge et al. | |
| 9,774,826 B1 | 9/2017 | Hodge | |
| 10,225,518 B2 | 3/2019 | Hodge | |
| 2003/0174826 A1 | 9/2003 | Hesse | |
| 2006/0087555 A1 | 4/2006 | Boyd et al. | |
| 2006/0259755 A1 | 11/2006 | Kenoyer | |
| 2007/0071206 A1 | 3/2007 | Gainsboro et al. | |
| 2008/0000966 A1 | 1/2008 | Keiser | |
| 2008/0040780 A1 * | 2/2008 | Reinhold ............ | H04L 63/0861 726/5 |
| 2008/0118042 A1 * | 5/2008 | Hogg .................. | H04M 3/2281 379/93.03 |
| 2008/0201158 A1 | 8/2008 | Johnson et al. | |
| 2011/0096138 A1 | 4/2011 | Grimshaw | |
| 2011/0194488 A1 | 8/2011 | Kuo et al. | |
| 2011/0249073 A1 | 10/2011 | Cranfill et al. | |
| 2012/0262271 A1 | 10/2012 | Torgersrud et al. | |
| 2012/0281058 A1 * | 11/2012 | Laney .................... | H04N 7/147 348/14.03 |
| 2013/0036369 A1 | 2/2013 | Mitchell et al. | |
| 2013/0179949 A1 | 7/2013 | Shapiro | |
| 2013/0194377 A1 | 8/2013 | Humphries | |
| 2013/0332509 A1 | 12/2013 | Schwartz et al. | |
| 2014/0218466 A1 | 8/2014 | Bloms et al. | |
| 2014/0267547 A1 | 9/2014 | Torgersrud et al. | |
| 2014/0273929 A1 | 9/2014 | Torgersrud | |
| 2014/0313275 A1 | 10/2014 | Gupta et al. | |
| 2015/0097919 A1 | 4/2015 | Karimi-Cherkandi et al. | |
| 2015/0189227 A1 | 7/2015 | Du et al. | |
| 2015/0294382 A1 | 10/2015 | Alsina et al. | |
| 2015/0334562 A1 | 11/2015 | Perold et al. | |
| 2016/0119580 A1 | 4/2016 | Torgersrud | |
| 2016/0239932 A1 | 8/2016 | Sidler et al. | |
| 2017/0083790 A1 * | 3/2017 | Risinger ................ | G06T 7/254 |
| 2017/0104958 A1 | 4/2017 | Farrell et al. | |
| 2017/0132468 A1 * | 5/2017 | Mosher .................. | G06T 7/246 |
| 2017/0236228 A1 | 8/2017 | Hodge et al. | |
| 2017/0280100 A1 | 9/2017 | Hodge | |
| 2017/0289498 A1 | 10/2017 | Hodge et al. | |
| 2018/0077387 A1 | 3/2018 | Hodge | |

OTHER PUBLICATIONS

Cartoux et al., "Face Authentication or Recognition by Profile Extraction from Range Images," IEEE Proceedings of the Workshop on Interpretation of 3D Scenes, Nov. 1989; pp. 194-199.

Copyright Registration Record for "iPhone: The Missing Manual," 6th ed., 2012; 1 page.

Defendant Global Tel*Link Corporation's Answer to Original Complaint and Counterclaims in *Securus Technologies, Inc.* v. *Global Tel*Link Corporation*, Case No. 3:14-cv-04233-M (N.D. Tex.), filed Jan. 12, 2015; 37 pages.

DSKeye Gigabit Product Brief, Bitec Ltd. 2007; 2 pages.

Excerpt from Merriam-Webster's Collegiate Dictionary, Tenth Edition, 2002; p. 841.

Excerpt from The American Heritage Dictionary, 5th Ed. (2016); p. 679.

Excerpt from the Dictionary of Computer and Information Technology, 2013; p. 272.

Excerpt from Webster's Third New International Dictionary, 2002; p. 22.

Excerpts from "iPhone: The Missing Manual," 6th ed., Sebastopol, CA: O'Reilly Media, 2012; 61 pages.

Excerpts from the Prosecution History of U.S. Pat. No. 7,256,816, U.S. Appl. No. 10/973,025, filed Oct. 25, 2004.

(56) References Cited

OTHER PUBLICATIONS

Felsberg, "Robot Vision Systems, PhD course spring term 2015," Computer Vision Laboratory PowerPoint Presentation, 2015; 23 pages.
File History of U.S. Pat. No. 9,007,420, U.S. Appl. No. 14/152,831, filed Jan. 10, 2014.
File History of U.S. Pat. No. 9,083,850, U.S. Appl. No. 13/931,857, filed Jul. 14, 2015.
Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.
Hjelmas et al., "Face Detection: A Survey," Computer Vision and Image Understanding, vol. 83, No. 3, Sep. 2001; pp. 236-274.
Huang et al., "Face Detection and Smile Detection," Proceedings of IPPR Conference on Computer Vision, Graphics, and Image Processing, Shitou, Taiwan, A5-6, 2009; 8 pages.
International Search Report and Written Opinion directed to International Patent Application No. PCT/US2017/014746, dated Mar. 21, 2017; 14 pages.
International Search Report and Written Opinion directed to International Patent Application No. PCT/US2017/017465, dated May 4, 2017; 14 pages.
International Search Report and Written Opinion directed to International Patent Application No. PCT/US17/14129, dated Feb. 17, 2017; 10 pages.
Kirby et al., "Application of the Karhurien-Loeve Procedure for the Characterization of Human Faces,", IEEE Transactions on Pattern Analysis and Machine Intelligence, vol. 12, No. 1, Jan. 1990; pp. 103-108.
Lopez, "Local Binary Patterns Applied to Face Detection and Face Recognition," Final Research Project, Universitat Politecnica de Catalunya, Nov. 2010; 146 pages.
Mazda et al., The Focal Illustrated Dictionary of Telecommunications, 1999; p. 555.
Prosecution History of U.S. Pat. No. 8,929,525, U.S. Appl. No. 14/323,582, filed Jul. 3, 2014.
Toderici et al., "Bidirectional relighting for 3D-aided 2D Face Recognition," Proceedings from IEEE Computer Vision and Pattern Recognition, Jun. 13-18, 2010, San Francisco, CA; pp. 258-274.
Turk et al., "Eigenfaces for Recognition," Journal of Cognitive Neuroscience, vol. 3, No. 1, 1991; pp. 71-86.
U.S. Appl. No. 61/801,861, filed Mar. 15, 2013; 77 pages.
Viola et al., "Rapid Object Detection Using a Boosted Cascade of Simple Features," Computer Vision and Pattern Recognition, 2001; pp. I-511-I-518.
Yang et al., "Detecting Faces in Images: A Survey," IEEE Transactions on Pattern Analysis and Machine Intelligence, vol. 24, No. 1, Jan. 2002; pp. 34-58.
Zhang et al., "A Survey of Recent Advances in Face Detection," Microsoft Research Technical Report No. MSR-TR-2010-66, Microsoft Corporation, 2010.
International Preliminary Report on Patentability, directed to related International Patent Application No. PCT/US2017/014129, dated Jul. 24, 2018; 6 pages.
International Preliminary Report on Patentability, directed to related International Patent Application No. PCT/US2017/017465, dated Aug. 14, 2018; 8 pages.
International Preliminary Report on Patentability, directed to related International Patent Application No. PCT/US2017/014746, dated Sep. 25, 2018; 7 pages.

\* cited by examiner

SECURE NONSCHEDULED VIDEO VISITATION SYSTEM

CROSS-REFERENCE TO RELATED APPLICATIONS

This application is a continuation application of U.S. application Ser. No. 15/713,181 filed Sep. 22, 2017, which is a continuation application of U.S. application Ser. No. 15/477,307 filed Apr. 3, 2017, now U.S. Pat. No. 9,774,826 issued on Sep. 26, 2017, which is a continuation application of U.S. application Ser. No. 15/341,517 filed Nov. 2, 2016, now U.S. Pat. No. 9,615,030 issued on Apr. 4, 2017, which is a continuation application of U.S. application Ser. No. 15/078,724 filed Mar. 23, 2016, now U.S. Pat. No. 9,558,523 issued on Jan. 31, 2017, which are incorporated herein by reference in their entirety.

BACKGROUND

Field

The disclosure relates to video communications, and specifically to video communications implemented via an inmate personal device in a controlled environment facility.

Related Art

American prisons house millions of individuals in controlled environments all over the country. The rights of these prisoners are largely restricted for a number of reasons, such as for their safety and the safety of others, the prevention of additional crimes, as well as simple punishment for crimes committed. However, these prisoners are still entitled to a number of amenities that vary depending on the nature of their crimes. Such amenities may include phone calls, commissary purchases, access to libraries, digital media streaming, as well as others.

One such amenity that is currently in the process of being provided to inmates of correctional facilities is that of video conferencing, also known as video calling or video visitation. However, like with all such services, video visitation services present a number of challenges that are unique to prisons. Conventional video visitation for residents (hereinafter "inmates") of controlled environments typically has required a process of scheduling prior to video visitation. One reason for the scheduling requirement is the specialized monitoring equipment and personnel required to monitor inmate communications.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
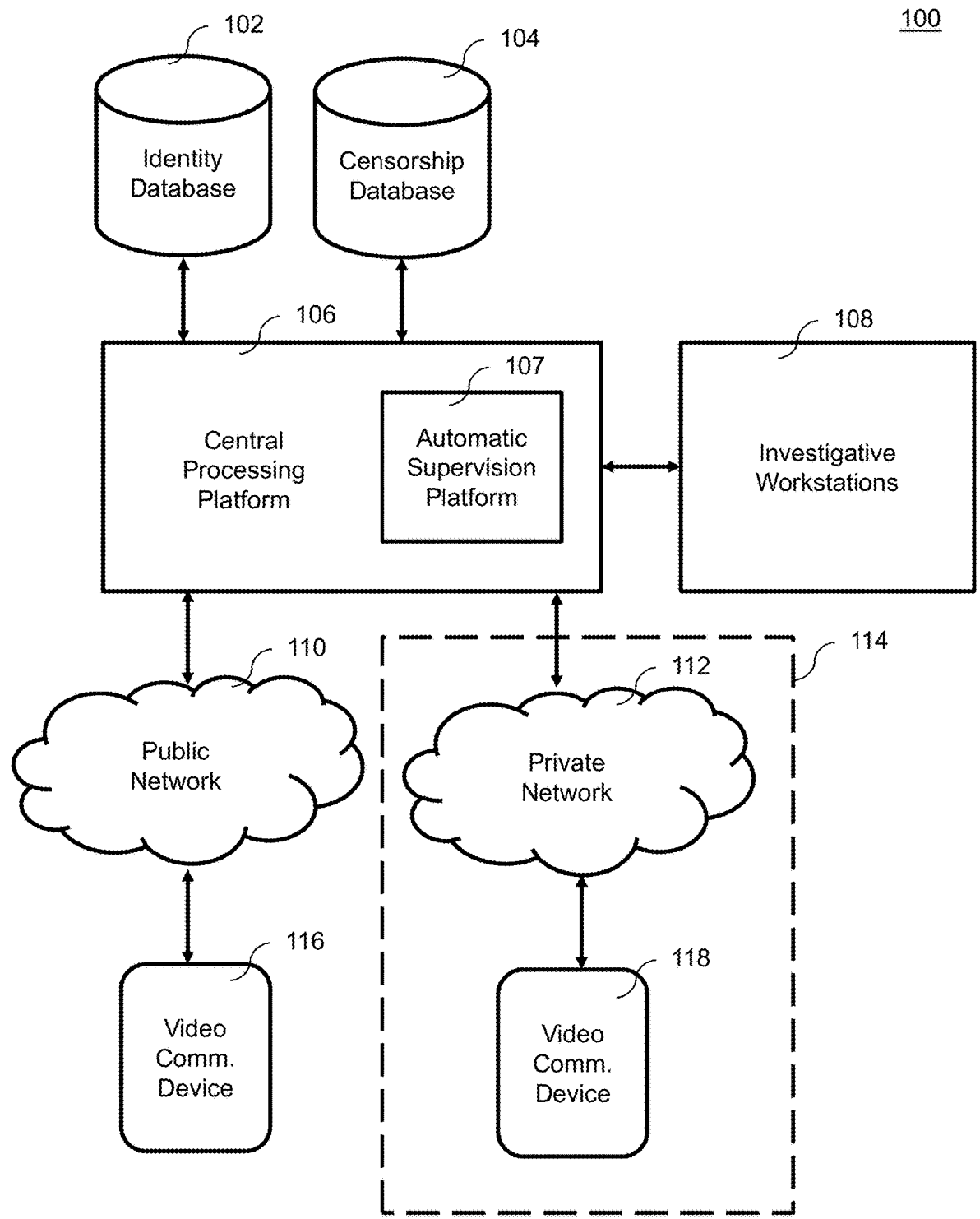
FIG. 1 illustrates an exemplary secure nonscheduled video visitation system.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, computer instructions, or any combination thereof. Embodiments may be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, or other hardware devices Further, firmware, routines, computer instructions may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer, as described below.

For purposes of this discussion, the term "module" shall be understood to include at least one of hardware (such as one or more circuit, microchip, processor, or device, or any combination thereof), firmware, computer instructions, and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many different communications protocols, and is not limited to video communications.

As previous discussed, there are many unique concerns associated with providing video communications to inmates of a controlled facility. One such concern is the supervision and surveillance of all communications with inmates. This is required to prevent unauthorized communications that may pose a risk to the inmate, the facility, or to others. For example, the use of video in the call can allow outsiders to provide detailed prohibited visual information to inmates in the form of pictures, schematics, video instructions, etc. Further, inmates would also be in a position to transmit prohibited information to outsiders such as prison layouts (e.g., via a visual scan), guard or other inmate identities, and sexual content, among others. Supervision tasks normally performed by facility personnel include monitoring these communications to detect any prohibited communications and taking appropriate actions in response to detecting prohibited communications. Because this supervision requires availability of personnel, the inmate and their contacts must normally schedule their video visitation sessions to coordinate with the facility personnel.

With these concerns in mind, it is preferable to automate the supervision of video visitation sessions so that facility personnel do not need to manually perform the supervision and censorship tasks. This has the effect of enabling facilities to allow unscheduled video visitation because of the reduced demands on facility personnel to supervise. With this objective in mind, the following description is provided of a system in which the censorship and supervision tasks normally performed by secured facility personnel are augmented or automated entirely by a Secure Nonscheduled Video Visitation System.

An Exemplary Video Conferencing Environment

FIG. 1 illustrates an exemplary Secure Nonscheduled Video Visitation System 100. In the environment 100, an inmate utilizes a Video Communication Device 118 within the confines of a secured facility to connect to an outside party. In an embodiment, the secured facility is a prison that houses inmates. In an embodiment, video visitation refers to the communications between inmates of prisons and outside contacts such as friends, family, clergy, attorneys, and instructors for educational courses. The outside party also possesses a video communication device 116 capable of receiving and/or transmitting audio and/or video data to an inmate within the prison. The video communication devices 116 and 118 are any combination of hardware and/or software that allows transmission and/or reception of video and/or audio information to an outside party. Exemplary embodiments of the video communication devices 116 and 118 include a tablet computer, a laptop computer, a smartphone, a personal digital assistant, a stationary kiosk, and a videophone. Video communication devices 118 provided to or made available to inmates within prisons are often hardened against damage from vandalism and restricted in the content they can access. The secured facility may select any appropriate combination of video communication devices for Video Communication Device 118 to meet their security and performance requirements.

The Video Communication Device 118 used by the inmate is communicatively coupled to a Central Processing Platform 106. Video communication device 116 is connected to the Central Processing Platform 106 via a public network 110 such as the Internet. Video communication device 118 is connected to the Central Processing Platform 106 via a private network 110 such as a Local Area Network. The network connection of either video communication device can be a wired or wireless network connection, such an Ethernet connection, a WiFi connection, or a cellular connection.

In one embodiment, the Central Processing Platform 106 is located on the premise of the secured facility. In another embodiment, the Central Processing Platform 106 is located remotely from the secured facility. The Central Processing Platform 106 is capable of processing video visitation sessions for one or more facilities simultaneously.

Central Processing Platform 106 is connected to Investigative Workstations 108. Investigative Workstations 108 are workstations where human operators can intervene in the operation of the Central Processing Platform 106 to supervise or disconnect video visitation sessions. As will be explained in further detail below, the Central Processing Platform 106 will at times trigger an alert to the Investigative Workstations 108 to indicate that intervention is necessary. In an embodiment, the operators of Investigative Workstations 108 can also intervene with video visitation sessions by their own volition. For example, the operators of Investigative Workstations 108 can monitor a video visitation session to ensure that the Central Processing Platform 106 is working properly.

Figure 2A:
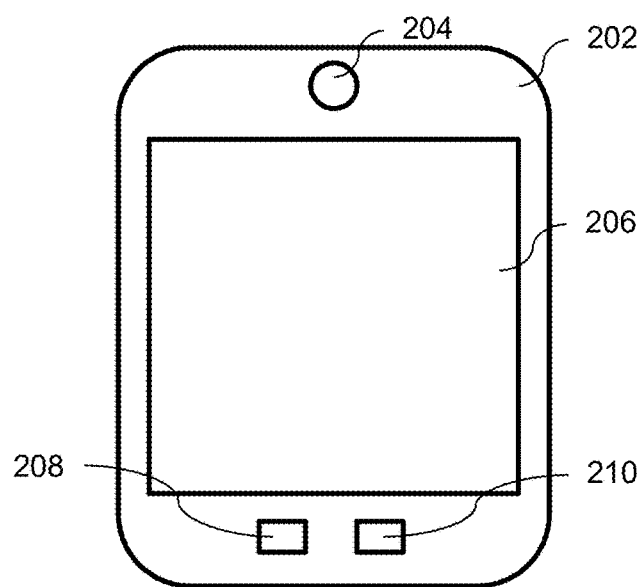
FIG. 2A illustrates a perspective view of an exemplary video communication device.

FIG. 2A illustrates an example of a video communication device that is in a tablet computer form factor. Tablet computer Video Communication Device 202 includes one or more Imaging Sensors 204, Screen 206, Microphone 208, and Speaker 210. In an embodiment the Imaging Device 204 is a two dimensional imaging device such as a charge-coupled device (CCD) or complementary metal-oxide-semiconductor (CMOS) image sensor. In some embodiments, the video communication device contains two or more two dimensional imaging devices. For example, two imaging devices with differing vantage points provide additional information that a single imaging device cannot.

In another embodiment, Imaging Device 204 contains a three-dimensional imaging sensor. Three-dimensional imaging sensors include stereoscopic cameras, structured light scanners, laser range finding, and depth-sensing image-based three dimensional reconstruction devices. Each of the modules described herein are operable on two dimensional or three dimensional images and/or video content.

Figure 2B:
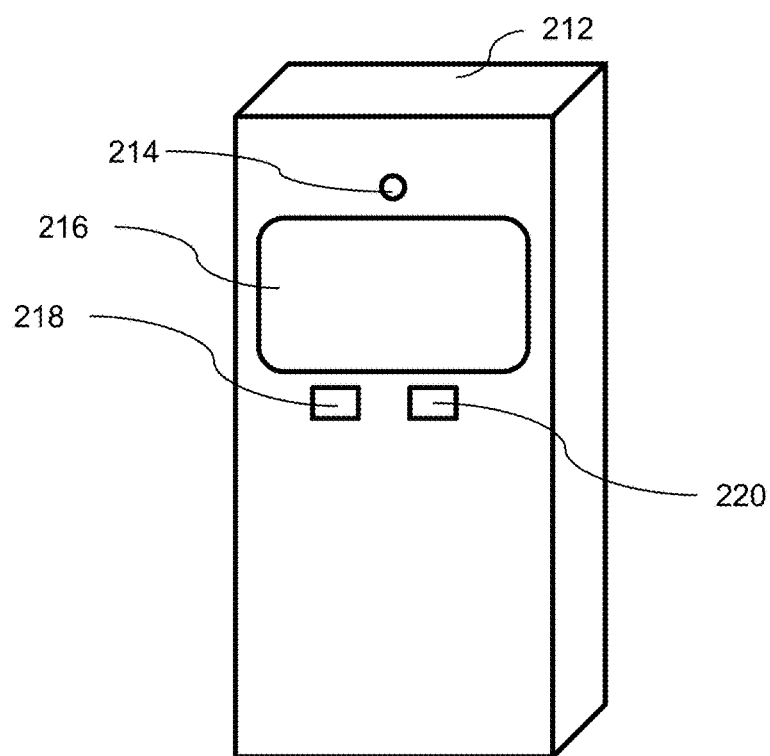
FIG. 2B illustrates a perspective view of an exemplary video communication device.
Figure 3:
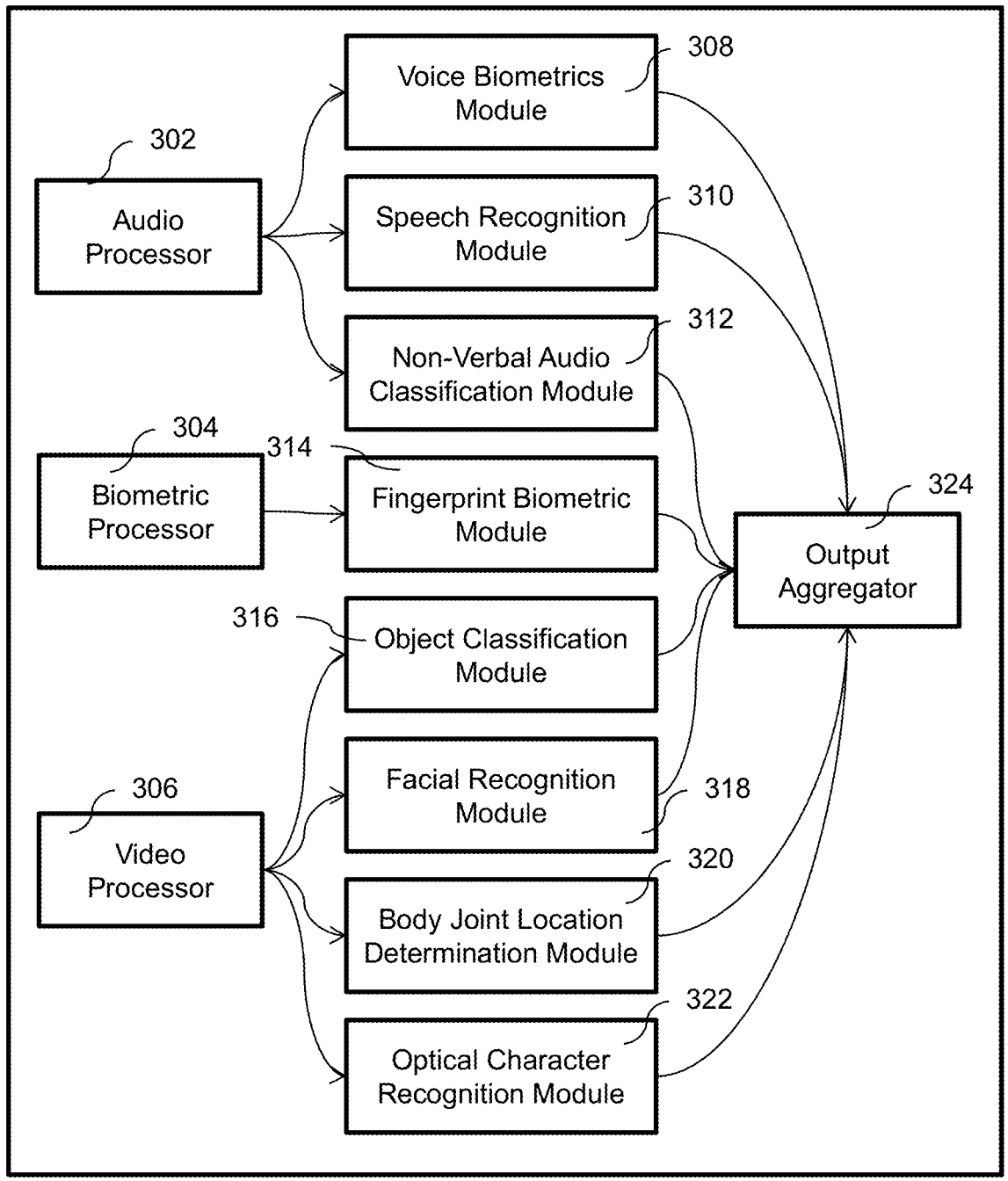
FIG. 3 illustrates a block diagram of an exemplary secure nonscheduled video visitation system.

Another example of a video communication device compatible with the Secure Nonscheduled Video Visitation System 100 is a kiosk form factor illustrated in FIG. 2B. Video communication kiosk 212 includes one or more imaging sensors 214, screen 216, microphone 218, and speaker 220.

The Secure Nonscheduled Video Visitation System 100 includes Identity Database 102 that holds identity data. In an embodiment, the identity data stored in Identity Database 102 is a name, a picture of the person's face, a home address, and a phone number. Other identifying data can be stored in the Identity Database 102 as needed by the Central Processing Platform 106. For example, in an embodiment the Identity Database 102 stores fingerprint information for each person in the database.

Censorship Database 104 includes data items that are deemed by the jurisdiction operating the secured facility to be disallowed in a video visitation session. In an example, Censorship Database 104 stores a list of key words and phrases that are disallowed on a video visitation session. The words and phrases stores in the Censorship Database 104 can be of any language, for example English, Spanish, French, German, etc. In an embodiment, for example, words in different languages with the same or similar meaning are linked to one-another in the Censorship Database 104. Other embodiments store censored images, image categories, gestures, or non-verbal audio in the Censorship Database 104.

In an embodiment, the Identity Database 102 and Censorship Database 104 are unique for each Central Processing Platform 106 installation. In another embodiment, multiple installations of Central Processing Platform 106 share Identity Database 102 and Censorship Database 104.

The Central Processing Platform 106 is hardware and/or software configured to analyze and process audio and video information from video visitation sessions to determine if the content of the video visitation session is in accordance with the rules and regulations set by the jurisdiction operating the prison. The Central Processing Platform 106 includes Automatic Supervision Platform 107 that applies one or more analysis steps using one or more analysis modules.

In an embodiment, Automatic Supervision Platform 107 includes Audio Processor 302, Biometric Processor 304, and Video Processor 306 to receive data from a video visitation session. The Automatic Supervision Platform 107 contains eight different modules 308-322 that extract data from these inputs and provide output to an Output Aggregator 324. The Automatic Supervision Platform 107 takes the output of all applied analysis modules and produces an aggregate output for each video visitation session. The Output Aggregator 324 of Automatic Supervision Platform 107 provides instructions to the Central Processing Platform 106 to control the video visitation session. The details of modules 308-322 are discussed in more detail below.

Figure 4:
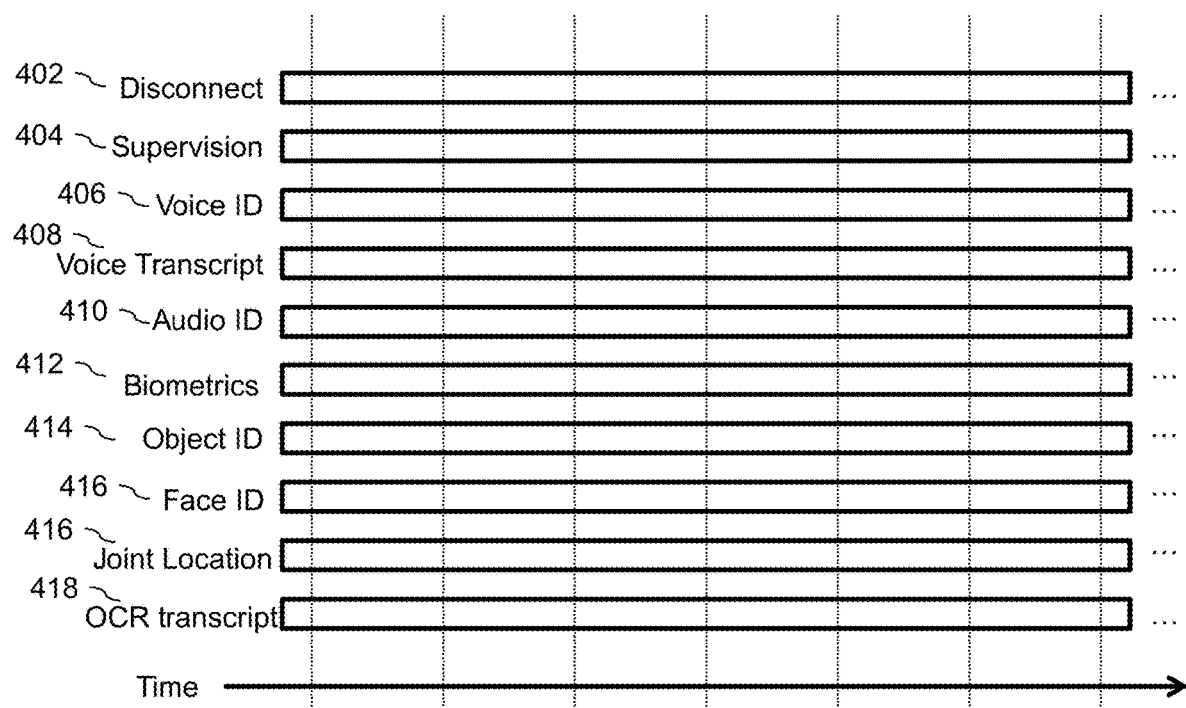
FIG. 4 illustrates an exemplary multi-factored real time status indicator.

The output of the Automatic Supervision Platform 107 is a multi-factored real time status indicator for each video visitation session. The status indicator is a reflection of the content of the video visitation session. An example embodiment of this multi-factored real time status indicator is illustrated in FIG. 4. The status indicator includes one or more values that are continuously updated throughout the video visitation session that reflect some attribute of the video or audio content. One exemplary status indicator illustrated as 402 simply indicates whether or not the video visitation should be allowed to continue. If this status indicator ever turns negative, meaning the Automatic Supervision Platform 107 has indicated the video visitation should not continue, the Central Processing Platform 106 will disconnect the video visitation session in question. Another exemplary status indicator is whether or not the video visitation requires human operator supervision as indicated by line 404. In an embodiment, the threshold for requiring human supervision is less than the threshold for disconnecting the video visitation immediately. For example, if the analysis module detects a low likelihood of unauthorized communications the system will turn on the human supervision status indicator. But if the analysis module detects a high likelihood of unauthorized communications, the system will turn on the disconnection status indicator resulting in the immediate termination of the video visitation session. Additional status and metadata outputs are provided for each active analysis module on lines 406-418. Every status or metadata output 402-418 is timestamped so that corresponding indicators on multiple status lines are correlated in time.

These status indicators are produced by the Central Processing Platform 106 by weighing the individual outputs of each analysis step. For example, each analysis step has a flag corresponding to the DISCONNECT and SUPERVISE flags that is read by the Central Processing Platform 106. The global DISCONNECT and SUPERVISE flags are a weighted combination of all the outputs of all applied analysis steps. In the most basic embodiment, any individual analysis step that outputs a positive DISCONNECT or SUPERVISE flag in turn is reflected in the global status indicator. But in some embodiments, it may be advantageous to weigh the individual analysis step outputs to produce a global status flag.

Each module has various sensitivity settings that affect efficiency and accuracy. The operator can set a higher threshold to decrease false positive results, or a lower threshold to decrease false negative results. These threshold tolerances can be adjusted on the fly to accommodate operator availability and the demand for video visitation. For example, if there are many investigative operators available to analyze video visitation feeds, the thresholds may be set lower so that there is lower likelihood of any censored content on the Secure Nonscheduled Video Visitation System 100. Conversely, if investigative operators are overworked and have less time to dedicate to each video visitation session individually, the various thresholds may be set higher so that only modules with a high confidence generate an alert to the investigative operators. In this way the Secure Nonscheduled Video Visitation System 100 can balance security with efficiency as demands on the system change.

Other exemplary data streams are added to the basic status indicators by each individual analytics module described below. For example, a speech recognition module is described below and that module optionally adds a text transcript to the status indicator stream. Other analytics modules likewise are capable of adding their own outputs to the status indicator stream, as described below. The selection of which data to capture and record is configurable by the operator of the secure nonscheduled video visitation system.

Operation

In an embodiment, the Central Processing Platform 106 enables video visitation between a user of video communication device 116 and a user of Video Communication Device 118. Under normal circumstances, the Central Processing Platform 106 utilizes the Automatic Supervision Platform 107 to analyze the content of the video visitation session to determine if the video visitation session is in accordance with all rules enforced by the jurisdiction operating the Secure Nonscheduled Video Visitation System 100. However, some communications are privileged and will not be monitored or recorded. For example, the system will provide a non-monitored session for attorney client communication. This status is indicated in the Identity Database 102, and is associated with each individual inmate using the Secure Nonscheduled Video Visitation System 100.

Additionally, the Secure Nonscheduled Video Visitation System 100 supports time limits associated with video visitation sessions. In an embodiment, the Secure Nonscheduled Video Visitation System only allows a certain number of minutes per month of unscheduled video visitation. In another embodiment, the Secure Nonscheduled Video Visitation System 100 only allows unscheduled video visitations of a certain length. Other time restrictions include limiting the availability of unscheduled video visitation to certain days of the week or hours of a day. Individuals may also set a schedule of times that they do not want to be disturbed by unscheduled video visitation requests.

In an embodiment, the Secure Nonscheduled Video Visitation System 100 allows remote users to block communications from inmates. For example, if an outside user does not wish to be contacted by a given inmate, the outside user can indicate so to the Secure Nonscheduled Video Visitation System and the system will not allow communication attempts to that individual.

While the automated supervision features of the Secure Nonscheduled Video Visitation System 100 allow for unscheduled video visitation, the system also supports scheduling of video visitation sessions. If the calling and called parties chose to have a schedule, the system supports this. The parties can select a designated time of the day, week or month to set an appointment for a video visitation session. The calling and called parties can also schedule a visitation session by sending the other parties a meeting request.

Registration Process

Some embodiments require the Identity Database 102 to contain the identity of parties to the video visitation session in order to operate. For these embodiments, the Central Processing Platform 106 performs a registration process the first time a party accesses the Secure Nonscheduled Video Visitation System 100.

In an embodiment, the registration process for the Secure Nonscheduled Video Visitation System 100 requires the calling and called parties to supply facial image and voice samples as well as a government issued identification document in order to complete the registration process for session calling. In an embodiment, this may be accomplished by a downloaded application for the non-resident's smartphone or other video communication device. In an embodiment, the Identity Database 102 is pre-populated with information from inmates of a secured facility that the jurisdiction operating the secured facility has already gathered for those people. For example, the Identity Database 102 can be pre-loaded with identification information and fingerprints for all inmates of a prison.

Voice Biometrics Module

The Voice Biometrics Module 308 utilizes voice biometrics to identify the speakers participating in the video visitation session. This process is also referred to as speaker-dependent voice recognition, or speaker recognition. The Voice Biometrics Module 308 has access to a voiceprint database of potential participants to video visitation sessions. The Voice Biometrics Module 308 compares one or more audio voiceprints from the voiceprint database to the current audio stream using one or a combination of frequency estimation, hidden Markov models, Gaussian mixture models, pattern matching algorithms, neural networks, matrix representation methods, vector quantization, or decision tree methods.

The resulting output is a matching voiceprint from the database and a confidence value. The confidence value reflects the degree of match. A higher confidence value indicates a greater degree of matching than a lower confidence value. In some embodiments the Voice Biometrics Module 308 produces a list of matching voiceprints and corresponding confidence values. In this was the speaker recognition module can provide multiple matches in the database where there is ambiguity in who is speaking.

In an embodiment, the Voice Biometric Module 308 operates on a single track of audio information containing both the inmate and the called party audio. This is referred to as full-duplex audio. In another embodiment, the Voice Biometric Module 308 operates on multiple tracks of audio corresponding to each video communication device used. For example, the audio track from the inmate's video communication device is processed separately from the audio track from the called party's video communication device. This can yield greater accuracy because the voice signals are isolated from each other. If more than two parties are party to the video visitation session each individual audio track can be processed separately.

The output of the Voice Biometrics Module 308 is a continually updated list of the identity of who is speaking. For example, when the inmate is speaking, the list has only the inmate. When the inmate and the called party are simultaneously speaking, the list contains both parties. This status is updated continuously throughout the session to reflect the current speaking parties.

In an embodiment, the Voice Biometrics Module 308 also has a DISCONNECT and SUPERVISE output that can be triggered in response to the voice biometric analysis. For example, if a person is identified in the database as not being allowed to contact the inmate, the Voice Biometrics Module 308 raises the DISCONNECT flag output. Another example is if the Voice Biometrics Module 308 does not find a match for a speaker on a video visitation session, it may raise the SUPERVISE output to indicate that a human operator should monitor the call to determine if the unidentified speaker is authorized or not.

Speech Recognition Module

The Speech Recognition Module 310 converts spoken word contained in the video visitation audio into computer readable text. This text is then, in turn, monitored for key words and phrases designated by the jurisdiction operating the secured facility. The Speech Recognition Module 310 connects to the global Censorship Database 104 to retrieve a list of words and phrases to check against in real time. For example, the mention of the words "break out of prison" may be designated by the operators of the secured facility as inappropriate and contained in a blacklist of phrases or words stored in Censorship Database 104.

Speech Recognition Module 310 can operate on any language deemed necessary by the jurisdiction operating the secured facility. Specifically, Speech Recognition Module 310 is capable of recognizing spoken words or phrases in multiple languages, for example English, Spanish, French, German, etc. In an embodiment, the jurisdiction operating the secured facility can select the language or languages to operate on. In another embodiment, the Speech Recognition Module 310 can operate on all languages simultaneously and detect the language of the spoken words and phrases in the video visitation audio content.

In an embodiment, Speech Recognition Module 310 translates spoken word in a first language into computer readable text in another language. This real-time translation enables the jurisdiction operating the secured facility to store words and phrases of only one language in Censorship Database 104, but detect these words or phrases in any recognizable language. First, Speech Recognition Module 310 recognizes the spoken words and phrases in a first language. Next, the Speech Recognition Module 310 translates the resultant recognized first language words and phrases into a second language using a translation service.

In one embodiment, the translation service is integral to the Speech Recognition Module 310. This allows the jurisdiction to modify the translation service as necessary to suit the particular needs of the secured facility. This customization may include translations for colloquialisms and slang terms that would not be present in a general purpose translation dictionary. In another embodiment, Speech Recognition Module 310 uses an off-site translation service. In an embodiment, the off-site translation service is provided by a third party. This off-site translation dictionary may be accessed through, for example, the Internet. The off-site translation dictionary may be either general purpose or specialized translation service as described above. Finally, the Speech Recognition Module 310 searches the Censorship Database 104 in the second language for the words or phrases that were spoken in the first language.

Like the Voice Biometrics Module 308, the Speech Recognition Module 310 operates on either a single track of full-duplex audio or multiple tracks of audio corresponding to each video communication device used.

The output of the Speech Recognition Module 310 is a computer-readable transcript of the verbal communications contained in the audio information of the video visitation. In an embodiment, the Speech Recognition Module 310 also has a DISCONNECT and SUPERVISE output that can be triggered when words or phrases contained in the global censorship database are detected. The global censorship database contains a list of words and phrases and the appropriate action to take when each word or phrase is detected. For example, the phrase "break out of prison" may trigger the DISCONNECT flag.

In an embodiment, the Voice Biometrics Module 308 and Speech Recognition Module 310 work in tandem to produce a real-time transcript of the audio information of the video visitation session where the speaker of each phrase is identified.

Non-Verbal Audio Classification Module

The Non-Verbal Audio Classification Module 312 performs classification of non-verbal sounds in the audio stream data. For example, the Non-Verbal Audio Classification Module 312 can identify the sound of a running car or a gunshot based on the audio data in the video visitation feed. This classification module can also identify when the audio information is not primarily verbal, which may indicate that verbal communication is being masked by some other sound. Situations such as these may require either human supervision or disconnecting the video visitation feed. The non-verbal audio analysis is performed by any combination of expert and machine learning systems including but not limited to probabilistic models, neural networks, frequency estimation, hidden Markov models, Gaussian mixture models, pattern matching algorithms, neural networks, matrix representation, Vector Quantization, or decision trees.

The output of the Non-Verbal Audio Classification Module 312 is a continuously updated list of the sounds identified. The list of sounds may include a title, such as 'gunshot' or 'car engine.' In an embodiment, the Non-Verbal Audio Classification Module 312 also has a DISCONNECT and SUPERVISE output that can be triggered when censored sounds are detected. For example, a prison may want to prohibit inmates from hearing certain songs or music because those songs are identified with gang affiliations.

Fingerprint Biometric Module

In an embodiment, at least some parties to the video visitation session are also required to provide other biometric information. This biometric information can be required one time for authentication or continuously during the video visitation session. One example of other biometric information is fingerprint biometric information provided by a Fingerprint Biometric Module 314. In an embodiment, the video communication device at one or both ends of the video visitation session have incorporated or attached to them a fingerprint reader. The fingerprint reader can be any kind of fingerprint reader including two dimensional and three dimensional fingerprint readers. In an embodiment, the video communication device is a smartphone with an integral fingerprint reader. In another embodiment the video communication device is a kiosk with a fingerprint reader exposed to the inmate.

In one embodiment the fingerprint biometric is gathered as an authentication step performed once at the initialization of a new video visitation session. In another embodiment the fingerprint biometric is sampled continuously during the video visitation session. For example, a participant to the video call can be required to keep their finger on a fingerprint scanner in order to remain connected to the video visitation session.

Other biometric information may be used in place of or in addition to fingerprints including palm prints, iris recognition, hand geometry, vascular matching (including finger vasculature in conjunction with fingerprint biometrics), and/or DNA matching. Each of these other biometrics may also be used as one-time authentication or continuously gathered during the video visitation session.

Object Classification Module

The Object Classification Module 316 identifies objects present in the image content of the video visitation stream. Any method of object classification strategy may be used in conjunction with the secure nonscheduled video visitation system. Object classification systems and methods include techniques based on support vector machines, Bayesian classifiers, neural networks, and other machine learning algorithms.

Figure 5A:
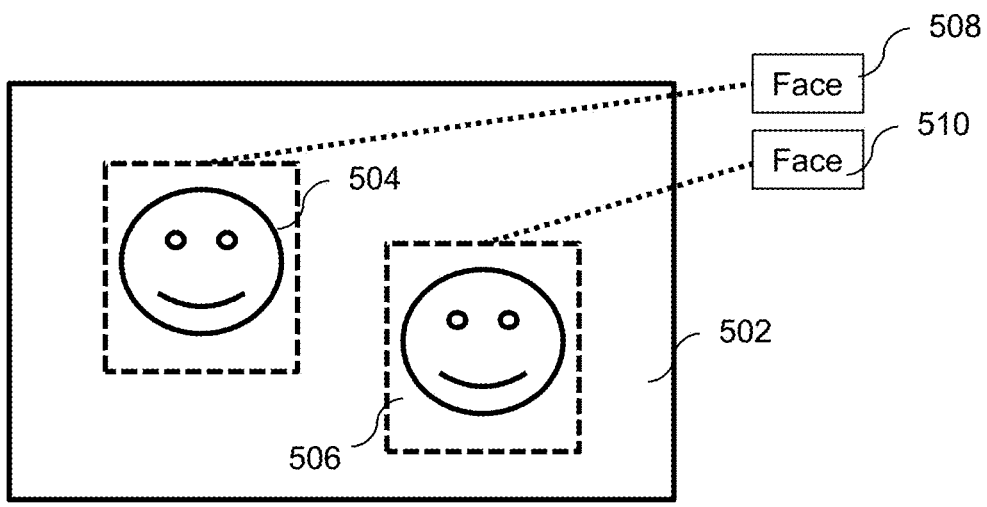
FIG. 5A illustrates the output of an exemplary object classifier module.

The goal of the Object Classification Module 316 is to identify regions of a still image or video sequence that correspond to an object. For example, the Object Classification Module 316 can identify people, chairs, photographs, weapons, drug paraphernalia, gang symbols, maps, or other types of objects that may be present in video visitation image data. One use of the Object Classification Module 316 is to identify faces in a video visitation system for further processing by the Facial Recognition Module 318. For example, in FIG. 5A the Object Classification Module 316 identifies regions 504 and 506 as faces in image data 502. The Object Classification Module 316 sends the image data corresponding to the face regions to Facial Recognition Module 318 for facial identification.

Figure 5B:
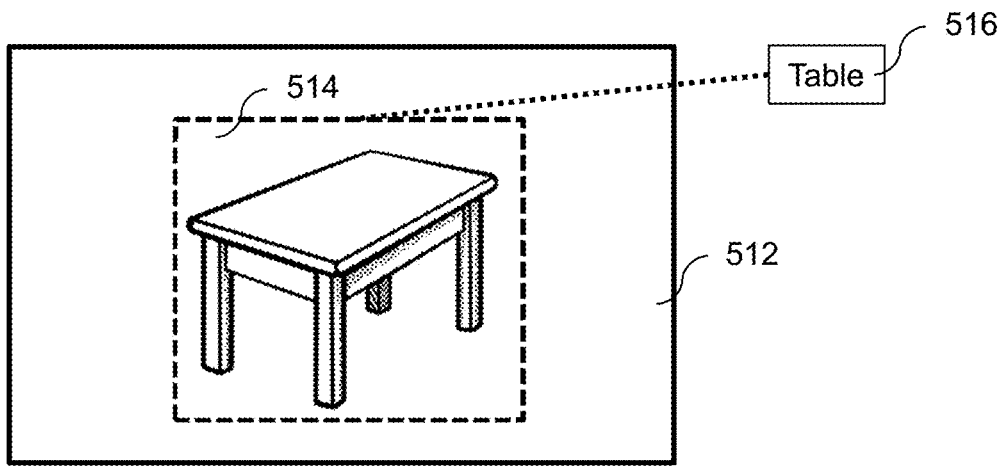
FIG. 5B illustrates the output of an exemplary object classifier module.
Figure 5C:
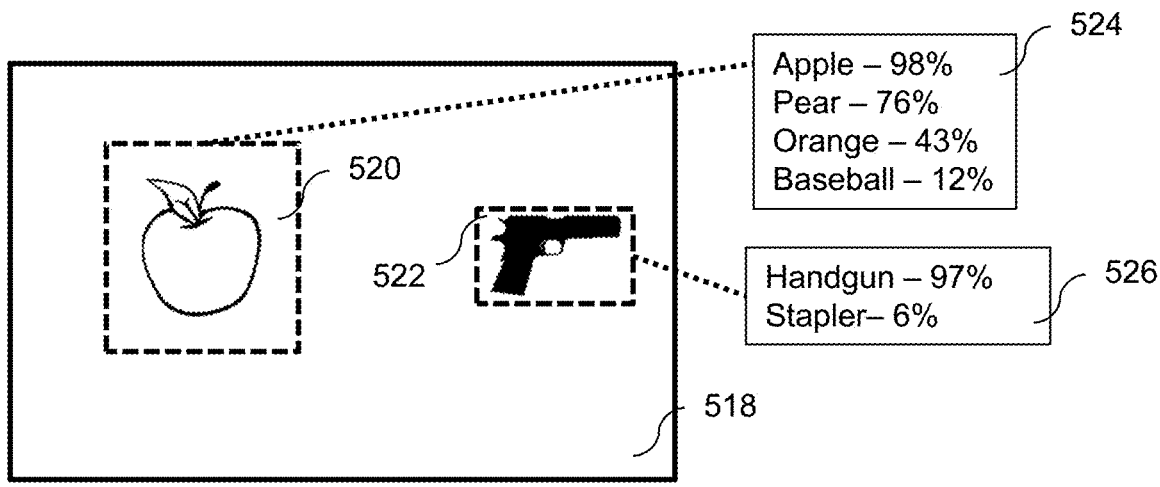
FIG. 5C illustrates the output of an exemplary object classifier module showing multiple confidence values for each object.

The output of the Object Classification Module 316 is the regions identified in the image data that correspond to objects and an indication of what the object is. In FIG. 5B the Facial Recognition Module 318 identifies region 514 of image data 512 as a Table 516. In an embodiment, the Object Classification Module 316 also outputs a confidence measure that indicates how confident the object classifier is that each region corresponds to the identified object. One embodiment of the Object Classification Module 316 produces information indicating rectangular regions, the type of object identified within that region, and a confidence value. For example, if a person holds up a gun the object classifier draws a box around the gun and identifies it as a gun, with a confidence value between 0% and 100%. For example, FIG. 5C illustrates two objects in image frame 518. The Facial Recognition Module 318 identifies regions 520 and 522 as corresponding to two objects. The object in region 520 is identified in output 524 with 98% confidence as an "Apple," with 76% confidence as a "Pear," as so on. Similarly, the object in region 522 is identified in output 526 as a "Handgun" with confidence 97% and a "Stapler" with confidence of 6%.

A higher confidence value reflects a greater likelihood that the bounded region identified is in fact what the object classifier states that it is. The operator of the Secure Nonscheduled Video Visitation System 100 can set confidence thresholds to trigger various responses such as DISCONNECT and SUPERVISE signals. In addition, the object classifier can be tuned to look for only certain objects and ignore others. For example, the object classifier can be programmed to respond to weapons but not babies.

In some embodiments, the Object Classification Module 316 works in conjunction with other data analysis modules described herein. For example, if an object is identified that has a high likelihood of containing textual information, the region of the image corresponding to the object is sent to the Optical Character Recognition Module 322 for character recognition. Similarly, if a face is detected by the object classifier, that region of the image is sent to the Facial Recognition Module 318 to identify the person in the image.

The object classifier can also be manually trained by investigative operators as they analyze video visitation streams. For example, if an operator identifies a banned object in a video feed that the Object Classification Module 316 did not identify, the operator can select the corresponding region of the video and classify it manually as some kind of object. That data, in turn, can then improve the accuracy of the Object Classification Module 316.

Facial Recognition Module

Figure 6A:
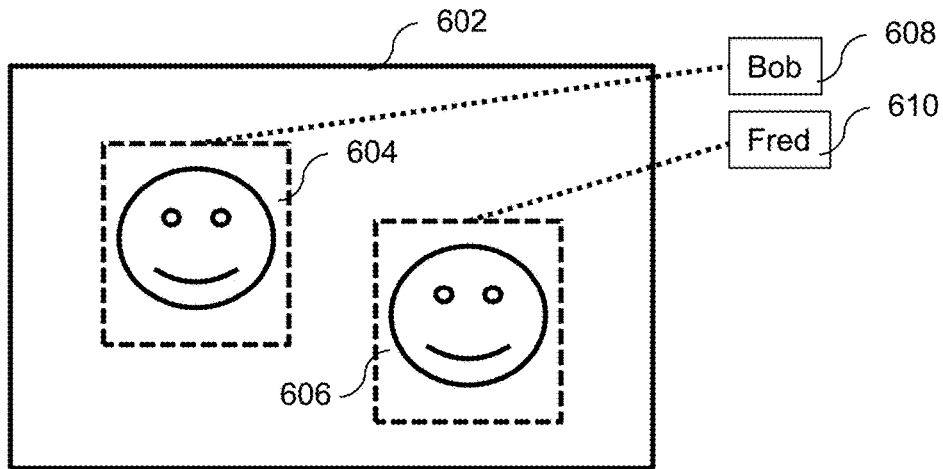
FIG. 6A illustrates the output of an exemplary facial recognition module.

The Facial Recognition Module 318 uses biometric facial image recognition to identify the people in the video visitation image. Identifying people party to the video visitation is crucial to maintaining safe and secure video visitation. In an embodiment, the Facial Recognition Module 318 is provided regions of the image frame that likely contain human faces as recognized by the Object Classification Module 316 316. In another embodiment, the Facial Recognition Module 318 detects regions of the image frame that likely contain faces. For example, FIG. 6A illustrates two regions 604 and 606 of image frame 602 that are identified as likely containing faces. These regions are processed by the Facial Recognition Module 318 to identify the individuals in the image. For example, in FIG. 6A the two faces are recognizes and "Bob" 608 and "Fred" 610.

To identify a person, the Facial Recognition Module 318 accesses a database of people who may appear in the video visitation. The database contains some identifying information correlated with one or more facial images or facial biometric values. For each inmate there are whitelists and blacklists of individuals who are allowed to be party to a video visitation. In the case of whitelists, only those individuals who are on the whitelist are allowed to participate in a video visitation session with an inmate. In the case of blacklists, the individuals on the blacklist are not allowed to participate in video visitation with the inmate.

The jurisdiction operating the Secure Nonscheduled Video Visitation System 100 may either allow or disallow unidentified faces in the video visitation. Even if unidentified persons are allowed to participate, the video visitation may be flagged for review by an investigative operator to ascertain the identity or relationship of the unidentified person. If the identity of the person is unknown, the investigative operator can add the unidentified person to the facial recognition database in order to track the communications with that person, even if their actual identify is unknown. For example, if an unknown face appears in a video visitation, the operator can add that face to the database. Then, in a future video visitation, that same person will be identified not by their actual identity, but by their appearance in the previous video visitation.

In an embodiment, the output of the Facial Recognition Module 318 is similar to the Object Classification Module 316 with the regions identified in the image data that correspond to faces and an indication of the identity of the person. In another embodiment, only the identities of those people on the video conferencing session are listed, without the regions of the video data corresponding to their faces.

Figure 6B:
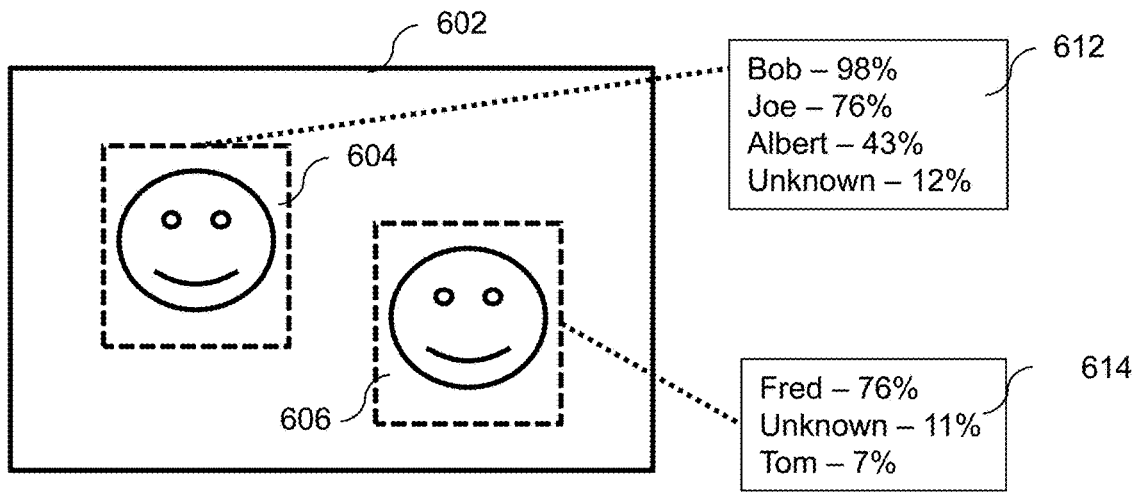
FIG. 6B illustrates the output of an exemplary facial recognition module.

FIG. 6B illustrates an embodiment of the Facial Recognition Module 318 that outputs a list of possible matches in the database that match the input image frame. For example, the same two regions 602 and 604 and the same image frame 602 as presented in FIG. 6A produce a different output. The output 612 and 614 includes not only the most confident matches, "Bob" and "Fred," but a complete or partial list of all potential matches with a confidence score. Here, Region 604 is identified as "Bob" with a confidence of 98%, but also matches "Joe" with a confidence of 76%. There is also a possibility of 12% that region 604 does not match any face in the database, as indicated by "Unknown."

Figure 6C:
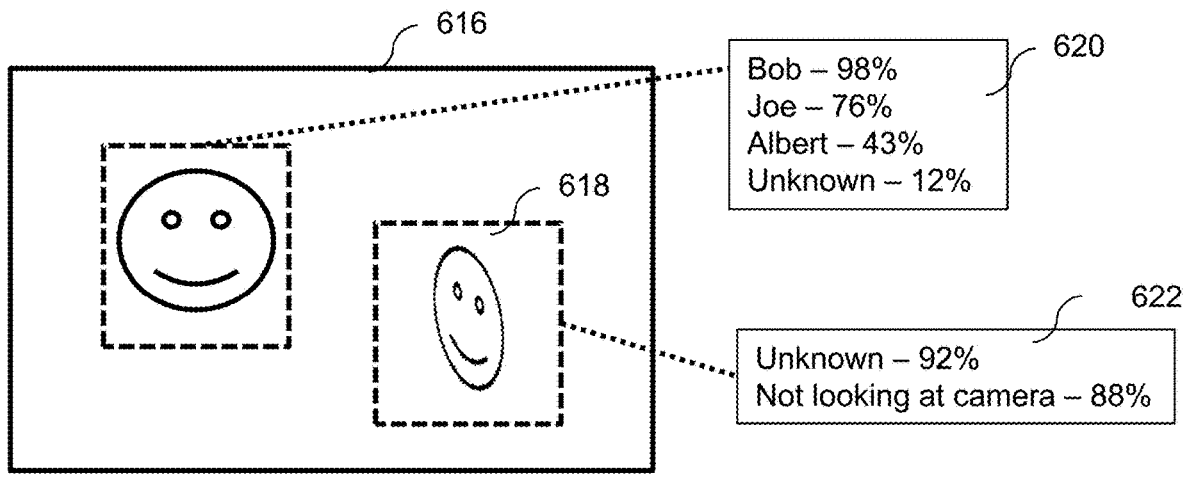
FIG. 6C illustrates the output of an exemplary facial recognition module.

Facial Recognition Module 318 also performs analysis of the faces detected in the image frame and indicates whether a face is not facing the camera. For example, FIG. 6C shows a region 618 of image frame 616 containing a face that is not looking at the camera. This is indicated in output 622 as "Not looking at camera." This kind of analysis may be important to operators of a secure video visitation session in that individuals may try to obscure their faces to avoid facial detection. The Facial Recognition Module 318 makes an attempt to detect such attempts to obscure faces. In an embodiment, the Facial Recognition Module 318 outputs a SUPERVISE flag in such situations to alert an operator that participants in the video visitation session are trying to bypass or deceive the Facial Recognition Module 318.

Other outputs of the Facial Recognition Module 318 include raising flags when individuals are positively identified on a blacklist. For example, if an inmate is attempting to communicate with a person on their blacklist then the Facial Recognition Module 318 raises the DISCONNECT flag.

Body Joint Location Determination Module

Figure 7A:
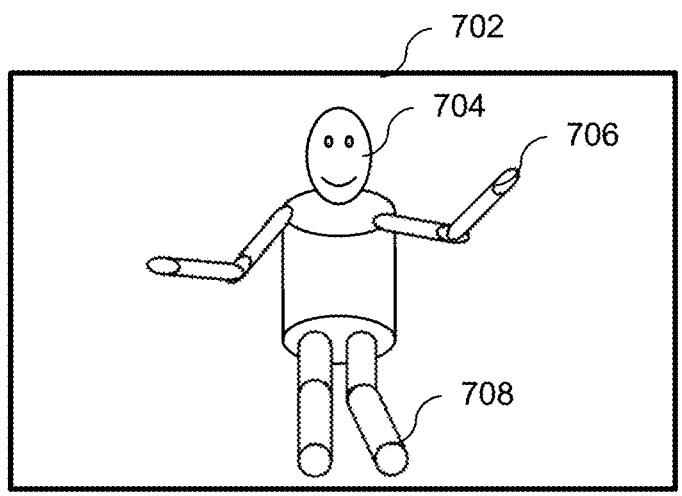
FIG. 7A illustrates the output of an exemplary body joint location determination module.

The Body Joint Location Determination Module 320 determines the location of people and portions of bodies within the video information of the video visitation session. The Body Joint Location Determination Module 320 detects human bodies and limbs and develops a kinematic model of the people imaged in the video information. For example, FIG. 7A illustrates a whole body kinematic model illustrating head 704 and limbs 706 and 708.

The Body Joint Location Determination Module 320 uses a kinematic model of the human body to identify body position and movement in the video information. The kinematic model is a model of the human body where joints are represented as points and limbs are represented as lines or volumetric objects connecting to one or more joints. FIG. 7A illustrates a volumetric kinematic model which may be produced by the Body Joint Location Determination Module 320 using either two dimensional or three dimensional imaging data from the video visitation session.

Figure 7B:
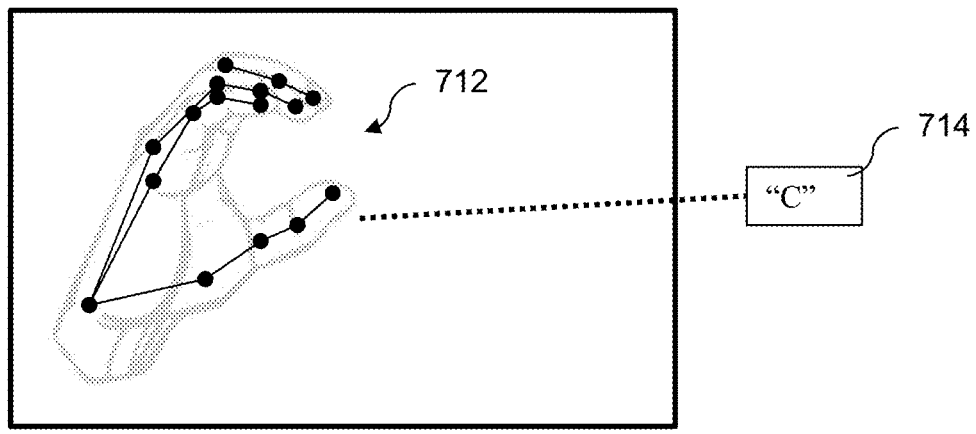
FIG. 7B illustrates the output of an exemplary body joint location determination module.
Figure 7C:
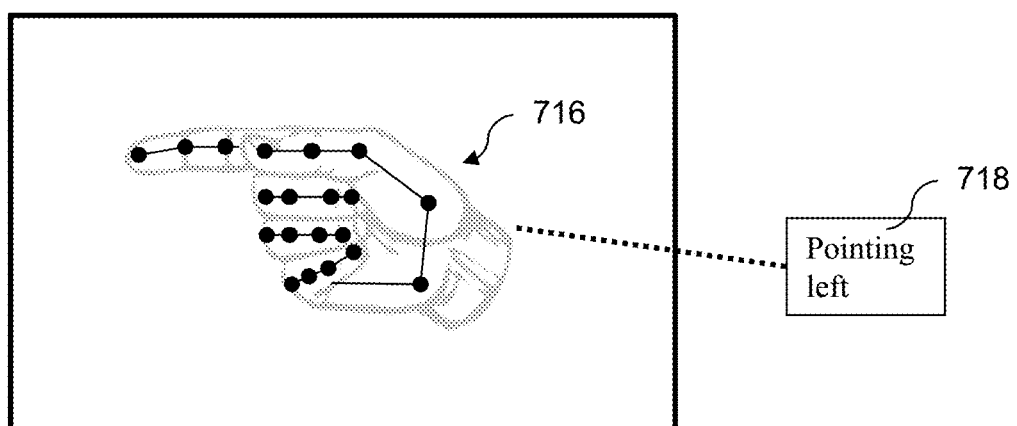
FIG. 7C illustrates the output of an exemplary body joint location determination module.

This technique is extended to the individual fingers and joints of the human hand to enable the Body Joint Location Determination Module 320 to determine hand position and orientation. For example, FIGS. 7B and 7C illustrate kinematic models of hands 712 and 716 performing gestures. In FIGS. 7B and 7C, the kinematic model used is illustrated as lines representing bones, and points representing joints. The Body Joint Location Determination Module 320 uses these kinematic models to interpret the gestures made in the video visitation session.

For example, the Body Joint Location Determination Module 320 can determine gestures and sign language used by people in the video feed. If sign language is detected, the Body Joint Location Determination Module 320 translates the sign language into searchable text. This searchable text is processed if sign language is not allowed by the system operator; the presence of sign language will be treated as contraband and appropriate action taken. FIG. 7B, for example, is an illustration of the Body Joint Location Determination Module 320 interpreting a gesture as the letter "C."

FIG. 7C is an illustration of the Body Joint Location Determination Module 320 interpreting a gesture in the context of the video visitation session as "pointing left. The Body Joint Location Determination Module 320 classifies gestures into one or more of several categories. If the gesture is identified as innocuous, such as pointing or waving, no action is taken. If the gesture is identified as disallowed, for example a gang sign or violent gesture, then the system operator can choose the appropriate response.

The outputs of the Body Joint Location Determination Module 320 are the detected kinematic models and any interpretative output such as indicating the gestures detected in the video frame. In an embodiment, the Body Joint Location Determination Module 320 also has a DISCONNECT and SUPERVISE output that can be triggered when words or phrases contained in the global censorship database are detected by interpreting sign language. The global censorship database contains a list of words and phrases and the appropriate action to take when each word or phrase is detected.

Optical Character Recognition Module

The Optical Character Recognition Module 322 utilizes Optical Character Recognition ("OCR") of image data to produce computer-readable text output from the image data of the video visitation session. OCR is the process of conversion of images of typed, handwritten, or printed text into machine-encoded text. Each frame of video image data is processed for OCR because objects may move between frames, or lighting conditions may alter the legibility of text in an image from one frame to the next. For example, words printed on paper and held up to the camera would be recognized by the Optical Character Recognition Module 322.

The OCR process begins with region identification and pre-processing. The region identification step identifies regions of a video frame that likely contain textual information. These regions are segmented and preprocessed for OCR. For example, if a piece of paper is identified in the image frame, the corresponding region of the image would be identified as having a high likelihood of containing textual information. The region identification and segmentation is performed by the Object Classification Module 316 in some embodiments, and independently by the Optical Character Recognition Module 322 in others. Alternatively, in an embodiment OCR is executed on the entire image frame, treating the entire frame as a segment for OCR.

After the image is segmented, the image is optionally processed through preprocessing steps to improve the OCR accuracy rate. One type of preprocessing is de-skewing. In de-skewing, the preprocessing engine identifies rotated portions of the image and corrects the skew distortion. For example, if a piece of paper is held up the camera but at an angle relative to the camera, the de-skewing step rotates the image so that the majority of textual data in the frame is square with the frame. This leads to better OCR success rates. Similarly, the preprocessing engine can correct keystone distortion.

Keystone or perspective distortion is a result of a flat surface held at an angle in one or more perpendicular axis to the image sensor. This effect is a similar to an off-center projector projecting onto a flat surface producing a trapezoidal shape rather than a rectangular shape. The keystone correction warps the image to correct those trapezoidal shapes into rectangular shapes.

Other pre-processing steps can be applied as necessary to produce the best OCR accuracy. Some OCR algorithms work best on binary, or black and white, images. In these cases, the image frame is converted to a binary image.

In all embodiments, once pre-processing of a video frame is complete, the identified regions containing textual information are processed by an OCR algorithm to produce computer-readable and searchable text. Any conventional OCR algorithm may be applied to extract meaningful textual data from the video image. Such OCR algorithms include pattern matching algorithms and feature detection algorithms, among others including neural network based detection and other methods adapted from general computer vision tasks.

The outputs of the Optical Character Recognition Module 322 are processed in a similar manner to the text output of the Speech Recognition Module. The output of the Optical Character Recognition Module 322 is a computer-readable transcript of the textual communications contained in the video information of the video visitation. In an embodiment, the Optical Character Recognition Module 322 also has a DISCONNECT and SUPERVISE output that can be triggered when words or phrases contained in the global censorship database are detected. The global censorship database contains a list of words and phrases and the appropriate action to take when each word or phrase is detected. For example, the phrase "break out of prison" may trigger the DISCONNECT flag.

Figure 8A:
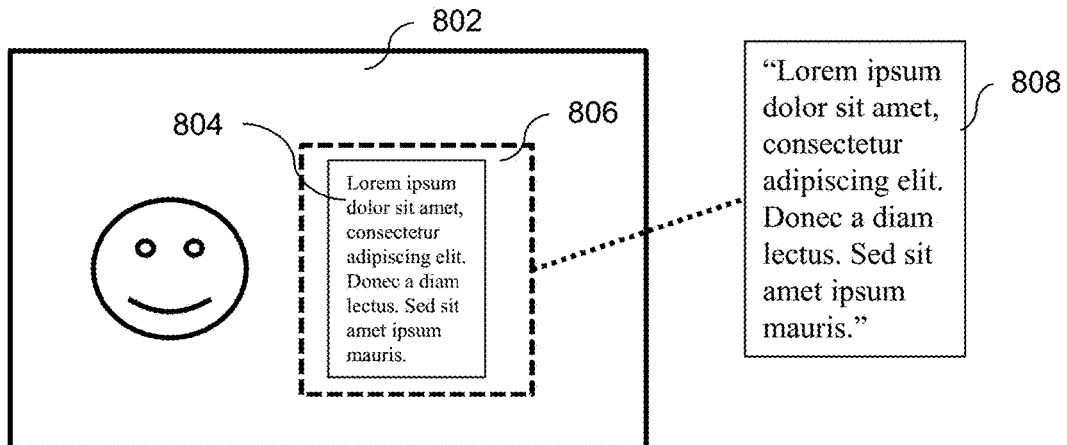
FIG. 8A illustrates the output of an exemplary optical character recognition module.

An example of the output of an exemplary Optical Character Recognition Module 322 is illustrated in FIG. 8A. The video frame 802 contains a piece of paper 804 with words written on it. The Optical Character Recognition Module 322 recognizes the area of interest containing written words and identifies this area as region 806. The Optical Character Recognition Module 322 processes the image data in region 806 to produce computer readable text 808.

Figure 8B:
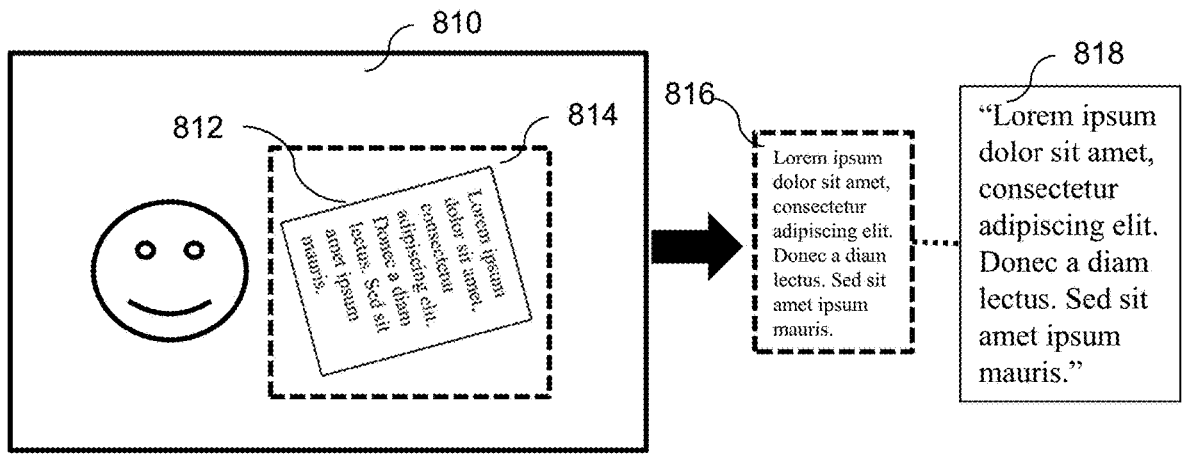
FIG. 8B illustrates the output of an exemplary optical character recognition module.

Similarly, FIG. 8B illustrates an example where the piece of paper 812 is held at an angle to the image frame 810. In this example, Optical Character Recognition Module 322 recognizes the region 814, de-skews the region to produce intermediate image data 816, and recognizes the characters in that image data as represented by computer readable test 818.

Figure 8C:
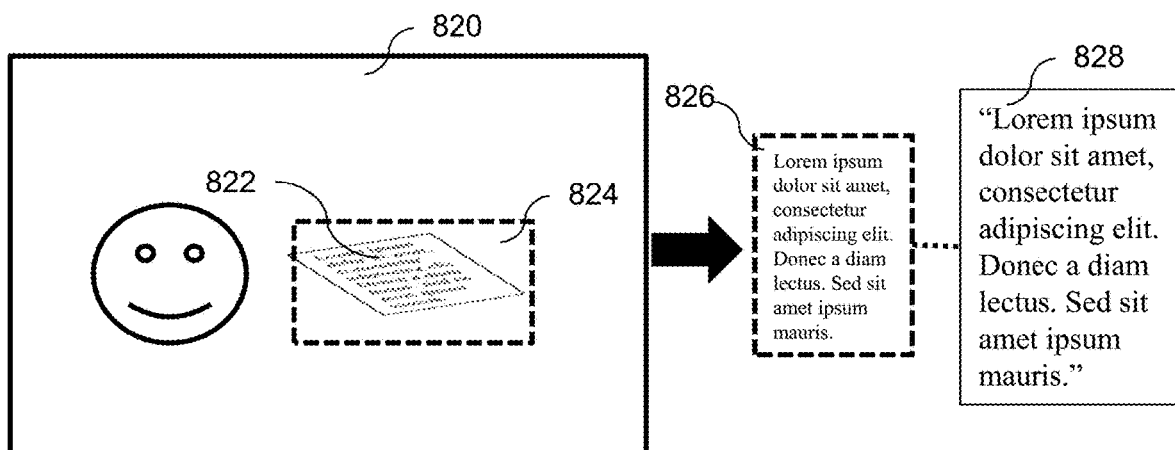
FIG. 8C illustrates the output of an exemplary optical character recognition module.

FIG. 8C illustrates the output of an exemplary Optical Character Recognition Module 322 where flat, written text 822 is presented in the video frame 820 at some combination of angles that produce keystone or perspective distortion. The Optical Character Recognition Module 322 utilizes keystone correction on the region 824 to produce corrected image date 826, which is then in turn processed by the Optical Character Recognition Module 322 to produce computer readable text 828.

Exemplary Operation

A video visitation session is conducted between a first user and a second user. In an embodiment, the first user is an inmate of a secured facility and the second user is one or more other individuals who are not inmates of the same secured facility. Examples of people that inmates of secured facilities want to have video visitations with include, but are not limited to, family members, friends, clergy, attorneys or other legal representatives, or inmates at other secured facilities. In operation, either the inmate or the other party establishes the video visitation session. Establishing the video visitation session is accomplished through dialing an access number such as a phone number, using a graphical user interface, or any other method of establishing a video visitation session. The other parties the inmate wishes to have a video visitation session with may be located at the secured facility in a dedicated video visitation area, at home, or at another location such as an office building. The video visitation session may be pre-arranged, or scheduled, or may be unscheduled and not pre-arranged. For example, a family member at home is able to spontaneously initiate a video visitation session with an inmate of a prison.

In operation, the Central Processing Platform 106 utilizes the output from the Automatic Supervision Platform 107 to control the state of a video visitation session. Example state variables that the Central Processing Platform 106 controls are connection state, recording state, and supervision state. Connection state refers to whether or not the connection is allowed to continue. If the output of the Automatic Supervision Platform 107 indicates a high likelihood that the rules set forth by the jurisdiction operating the secured facility are being violated by the content of the video visitation session, then the Central Processing Platform 106 can act on that information by disconnecting the video visitation session.

Recording state refers to whether or not the content of the video visitation session is being recorded. For example, the Automatic Supervision Platform 107 may flag certain segments of a video visitation session for recording, while others are not. In addition, the recorded segments can be tagged with various indicators corresponding to the analysis module outputs. For example, if a segment of a video visitation session contains an unknown face, that segment can be recorded and saved along with the facial recognition information from the Facial Recognition Module 318. In this way, a human supervisor can access the video visitation session segment at a later time to review the contents of that video visitation session.

Supervision state refers to whether or not the video visitation session should be monitored by a human operator at an Investigative Workstation 108. When the Automatic Supervision Platform 107 detects intermediate risk of restricted behavior in the video visitation session, where immediate disconnection would be uncalled for, then it may be appropriate to flag the session for real-time monitoring by a human operator. The human operator can then analyze the video visitation session and take appropriate action as necessary.

Exemplary Computer System Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 9:
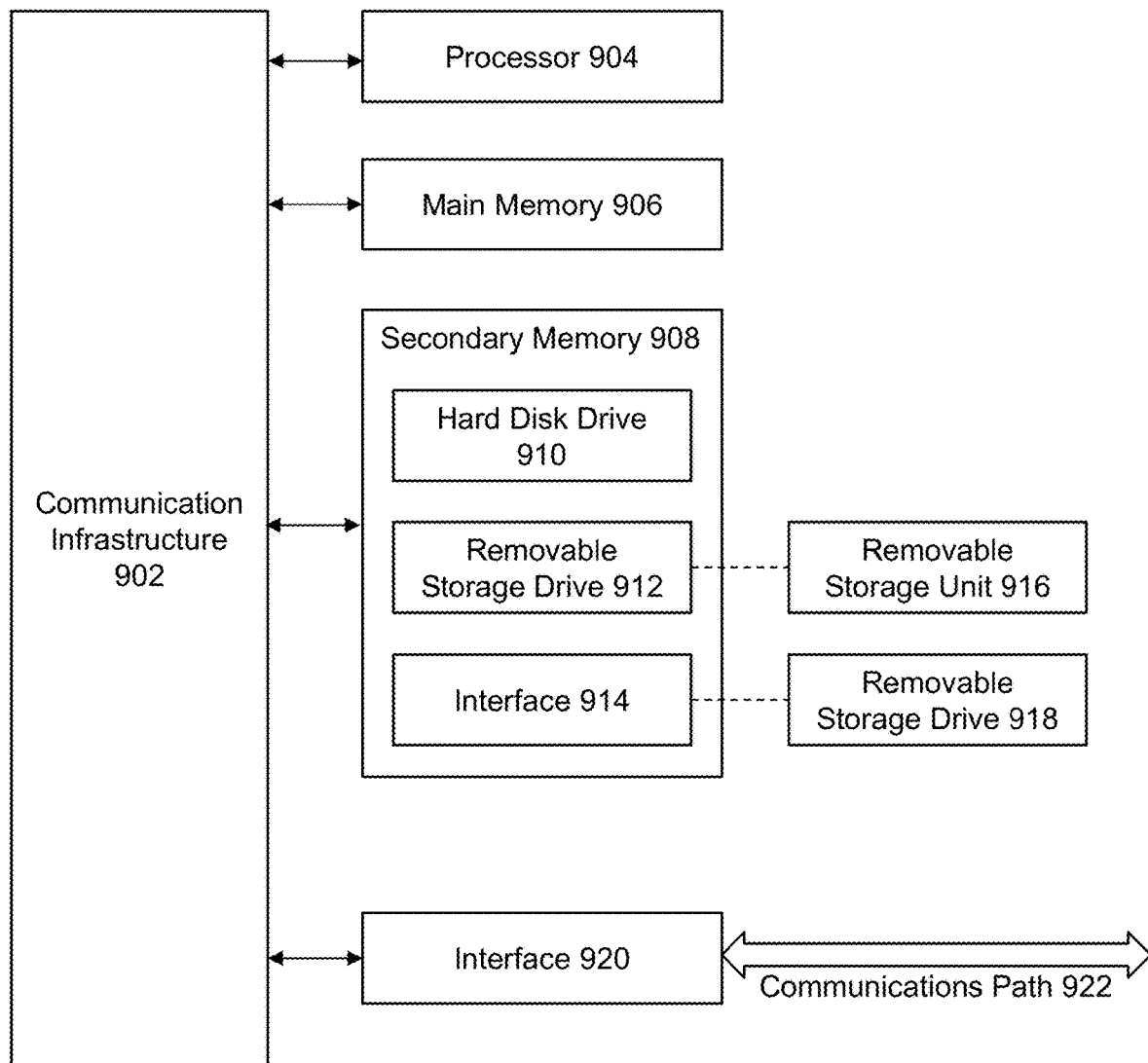
FIG. 9 illustrates an example computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. One or more of the modules depicted in the previous figures can be at least partially implemented on one or more distinct computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 520 may include a modem, a network interface (such as an Ethernet card), a communications port, a PCMCIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure.

What is claimed is:

1. A video visitation central processing platform comprising:
    one or more processors and/or circuits configured to:
        connect a video visitation session between a local video communication device and a remote video communication device;
        conduct a first analysis on video visitation data to identify at least one individual party to the video visitation session;
        conduct a second analysis on the video visitation data to detect a presence of a disallowed data item in the video visitation data, wherein the second analysis comprises object classification and at least one machine learning algorithm configured to classify objects in image data of the video visitation data; and
        control a state of the video visitation session based on determining output signals resulting from the first and second analyses to be above one or more predetermined thresholds.

2. The video visitation central processing platform of claim 1, wherein the first analysis comprises identifying a speaker in audio data of the video visitation session using voice biometrics.

3. The video visitation central processing platform of claim 1, wherein the second analysis further comprises recognizing spoken words in audio data of the video visitation data using speech recognition.

4. The video visitation central processing platform of claim 1, wherein the second analysis further comprises classifying non-verbal audio in audio data of the video visitation data using non-verbal audio classification.

5. The video visitation central processing platform of claim 1, wherein the first analysis comprises identifying a person in image data of the video visitation session using facial recognition.

6. The video visitation central processing platform of claim 1, wherein the second analysis further comprises identifying body location in image data of the video visitation data using body joint location determination.

7. A system for secure video visitations in a controlled environment, the system comprising:
    a local video communication device;
    a remote video communication device; and
    a video visitation central processing platform containing one or more processors and/or circuits, wherein the local video communication device, the remote video communication device, and the video visitation central processing platform are communicatively coupled via a network;
    wherein the one or more processors and/or circuits are configured to:
        connect a video visitation session between the local video communication device and the remote video communication device;
        conduct a first analysis on video visitation data to identify an individual party to the video visitation session;
        conduct a second analysis on the video visitation data to detect a presence of a disallowed data item in the video visitation data, wherein the second analysis comprises object classification and at least one machine learning algorithm configured to classify objects in image data of the video visitation data; and
        control a state of the video visitation session based on determining output signals resulting from the first and second analyses to be above one or more predetermined thresholds.

8. The system of claim 7, wherein the first analysis comprises identifying speakers in audio data of the video visitation data using voice biometrics.

9. The system of claim 7, wherein the second analysis further comprises recognizing spoken words in audio data of the video visitation data using speech recognition.

10. The system of claim 7, wherein the second analysis further comprises classifying non-verbal audio in audio data of the video visitation data using non-verbal audio classification.

11. The system of claim 7, wherein the first analysis comprises identifying people in image data of the video visitation data using facial recognition.

12. The system of claim 7, wherein the second analysis further comprises identifying body location in image data of the video visitation data using body joint location determination.

13. A method for secure video visitations in a controlled environment, the method comprising:
- connecting a video visitation session between a local video communication device and a remote video communication device;
- analyzing video visitation data to determine if content of the video visitation data is in accordance with a set of rules by object classification and at least one machine learning algorithm configured to classify objects in image data of the video visitation data;
- determining that the video visitation session is not in accordance with the set of rules by determining output signals resulting from the analyzing to be above one or more predetermined thresholds; and
- controlling a state of the video visitation session in response to the determination.

14. The method of claim 13, wherein the set of rules is determined by a jurisdiction operating a secured facility, and wherein the local video communication device is within the secured facility.

15. The method of claim 13, wherein the controlling the state of the video visitation session further comprises:
- disconnecting the video visitation session in response to determining that the video visitation session is not in accordance with the set of rules.

16. The method of claim 13, wherein the controlling the state of the video visitation session further comprises: flagging the video visitation session between the local video communication device and the remote video communication device for supervision.

17. The method of claim 13, wherein the video visitation session further comprises: making available a live feed of the video visitation session to an investigative workstation to monitor the video visitation session.

18. The method of claim 13, further comprising recording the video visitation session.

19. The video visitation central processing platform of claim 1, wherein the object classification and at least one machine learning algorithm comprise at least one of support vector machines, Bayesian classifiers, or neural networks.

\* \* \* \* \*